United States Patent
Zona et al.

[11] Patent Number: 5,178,032
[45] Date of Patent: Jan. 12, 1993

[54] ROBOT WRIST

[75] Inventors: Mauro Zona; Marco Bettinardi, both of Turin, Italy

[73] Assignee: Comau SpA, Turin, Italy

[21] Appl. No.: 770,209

[22] Filed: Oct. 3, 1991

[30] Foreign Application Priority Data

Oct. 4, 1990 [IT] Italy ............................ 67764 A/90

[51] Int. Cl.$^5$ ............................................. G05G 11/00
[52] U.S. Cl. ........................................... 74/479; 901/29
[58] Field of Search ................... 74/479; 901/21, 26, 901/29

[56] References Cited

U.S. PATENT DOCUMENTS

| | | | |
|---|---|---|---|
| 4,507,046 | 3/1985 | Sugimoto et al. | 901/29 X |
| 4,645,409 | 2/1987 | Gorman | 901/29 X |
| 4,671,732 | 6/1987 | Gorman | 901/29 X |
| 4,688,984 | 8/1987 | Nakashima et al. | 901/29 X |
| 4,771,652 | 9/1988 | Zimmer | 901/29 X |

FOREIGN PATENT DOCUMENTS

| | | |
|---|---|---|
| 74882 | 3/1983 | European Pat. Off. |
| 121843 | 10/1984 | European Pat. Off. |
| 122942 | 10/1984 | European Pat. Off. |
| 3717597 | 1/1988 | Fed. Rep. of Germany |
| 2160845 | 2/1986 | United Kingdom |

Primary Examiner—Leslie A. Braun
Assistant Examiner—David W. Laub
Attorney, Agent, or Firm—Sughrue, Mion, Zinn, Macpeak & Seas

[57] ABSTRACT

A wrist for an articulated robot has an operative member which is rotatable about three mutually perpendicular axes and three motor units each of which can cause the operative member to rotate about only one of the three axes without causing any rotation about the other axes.

1 Claim, 2 Drawing Sheets

ROBOT WRIST

BACKGROUND OF THE INVENTION

The present invention relates to an articulated industrial robot, that is, an industrial robot having at least one articulated arm with an articulated wrist at its distal end. The invention particularly concerns a wrist for a robot of this type.

Conventionally, the robot wrist carries an operative member, for example, a gripping member, which is rotatable about a plurality of axes. The wrist has a series of drive units for rotating the operative member about these axes. In conventional solutions, if the operative member is to be rotated about only one axis, more than one drive unit must always be operated, however, since it is necessary to operate both the drive unit controlling the preselected axis and at least one other drive unit in order to cancel out an undesired rotation about a further axis caused by the rotation about the preselected axis.

SUMMARY OF THE INVENTION

The object of the present invention is to eliminate this problem by the provision of a wrist in which it suffices to operate only one drive unit in order to rotate the operative member solely about the single, preselected axis.

In order to achieve this object, the subject of the invention is a robot wrist, characterised in that it includes:
- a support structure,
- a first drive unit connected rigidly to the support structure,
- a member driven by the first drive unit and supported by the support structure for rotation about a first axis, the driven member in turn supporting a further wrist portion for rotation about a second axis perpendicular to the first axis, the driven member in turn carrying a second drive unit for rotating the further wrist portion about the second axis, and the further wrist portion in turn carrying a third drive unit for driving an operative member of the robot which is rotatable on the further wrist portion about a third axis radial to the second axis.

The robot wrist according to the invention therefore has three motors which rotate the wrist respectively about three distinct, mutually perpendicular axes. The advantage of the device described above lies in the fact that the operation of only one motor rotates the wrist only about the axis controlled by that motor without causing undesired rotations about the other two axes which would have to be eliminated by the operation of the other motors.

BRIEF DESCRIPTION OF THE DRAWINGS

Further characteristics and advantages of the invention will become clear from the description which follows with reference to the appended drawings, provided purely by way of non-limiting example, in which.

DETAILED DESCRIPTION OF THE INVENTION

Figure 1:
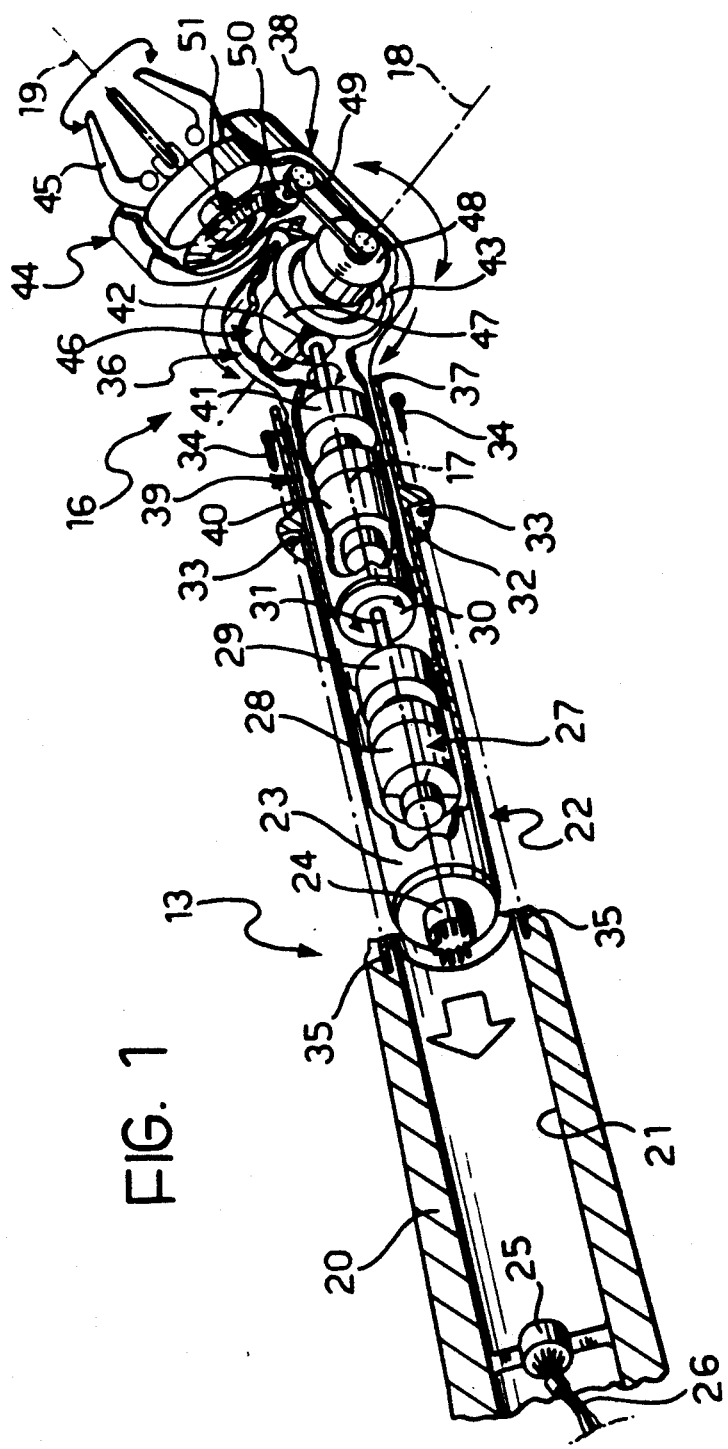
FIG. 1, is an exploded perspective view of a robot wrist according to the invention.
Figure 2:
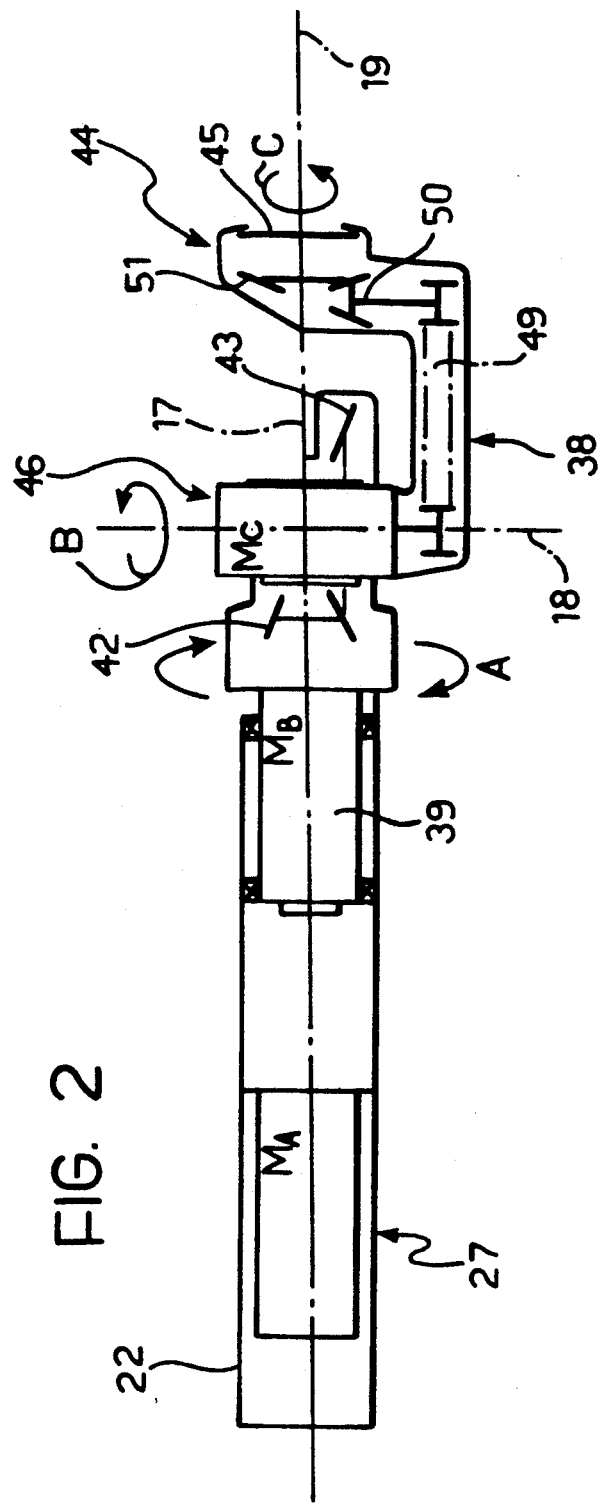
FIG. 2 is a schematic view of the wrist of FIG. 1.

FIGS. 1 and 2 show a robot arm 13 whose structure includes a casing 20 in the form of a shell-like structure (of one or more rigidly-interconnected pieces) having an open end for enabling the insertion in the cavity 21 in the shell of a module 22 which includes a wrist 16 and the respective operating motors and which is partially assembled so that it can then be fitted in the shell 20 in a single operation. The particular structure of the robot arm described above, with a casing which performs a carrying function and a module which is housed in the casing in a disconnectible manner and includes the various motors and their transmissions, is the subject of a copendent patent application by the same Applicant.

The module 22 includes a cylindrical casing 23 with an electrical connector 24 at one end for quick connection to a complementary connector 25 which is disposed in the cavity 21 in the shell-like structure 20 and is connected to electrical wires 26 leading from electrical supply means. The connector 24 is connected by wires (not shown) to the various electric motors in the module 22. With reference also to FIG. 2, a first drive unit 27 is supported rigidly in the casing 23 of the module 22 and includes an electric motor 28 and an epicyclic reduction unit 29 which may be of any known type, for example, of the type marketed by the German company Harmonic Drive GmbH under the trademark "HARMONIC DRIVE". A member 30 which is driven by the drive unit 27 by means of a shaft 31 is also supported in the casing 23 for rotation about its axis 17. The casing 23 of the module 22 has an external annular flange 32 with axial holes 33 for the passage of screws 34 which engage threaded holes 35 in the annular end surface of the shell-like structure 20 so as to fix the module 22 to the shell-like structure. Naturally, any other type of fixing may be used. The cylindrical body of the driven member 30 has a portion 36 which projects from an open end 37 of the casing 23 and constitutes the load-bearing structure of the wrist 16. The portion 36 supports a further portion 38 of the wrist for rotation about the axis 18 which is perpendicular to the axis 17. The portion 38 is rotated about the axis 18 by a drive unit 39 fixed in the cylindrical body of the driven member 30 and including an electric motor 40 and a reduction unit 41 similar to the reduction unit 29. The output shaft of the motor unit 39 rotates the portion 38 of the wrist by means of a pair of bevel gears 42, 43 connected for rotation with the output shaft and with the portion 38 of the wrist, respectively. The portion 38 is constituted by a hollow structure with a crank-like configuration having a distal end part 44 which supports a terminal element 45 (for example, a gripping member) for rotation about the axis 19 which is radial to the axis 18 and intersects the latter at its intersection with the axis 17. The terminal element 45 is rotated about the axis 19 by a drive unit 46 which, in the embodiment illustrated, is within the body 36 and is fast for rotation with the portion 38 of the wrist. Still with reference to the embodiment illustrated, the drive unit 46 comprises an electric motor 47 and a reduction unit 48 which drives the rotatable terminal element 45 by means of a toothed-belt transmission 49 and a pair of bevel gears 50, 51, the transmission 49 and the bevel gears 50, 51 being within the hollow structure of the portion 38 of the wrist. As is clear from the foregoing description, in the robot wrist according to the invention, the drive units 27, 39 and 46 rotate the terminal element 45 of the wrist about the axes 17, 18 and 19 respectively as shown be the arrows A, B, and C respectively, in FIG. 2. The operation of a single drive unit rotates the wrist exclusively about the corresponding axis without causing the undesired rotations about the other two axes which take place in known robot wrists in which, in order to rotate the wrist about one axis, it is necessary to operate one electric motor to cause the rotation and at least one further motor to eliminate the resulting undesired rotation about another axis.

A further advantage of the wrist arrangement described above lies in the fact that it enables the module 22 to be fitted telescopically in the shell-like structure 20 with a drive unit for moving the module 22 between a position in which it is retracted fully within the shell-like structure 20 and an extended position. This further degree of freedom further increases the working capacity of the robot. The linear movement of the module 22 along the axis 17 may be achieved in any known manner, for example, by a screw driven by a motor in the shell-like structure 20 and engaging a female thread carried by the module 22.

Naturally, the principle of the invention remaining the same, the details of construction and forms of embodiment may be varied widely with respect to those described and illustrated purely by way of example. For example, the motor 47 for rotating the operative member 45 about the axis 19 may be mounted directly on the distal end of the wrist portion 38, thus avoiding the use of the belt transmission 49.

What is claimed is:
1. A robot wrist including:
   a support structure,
   a first drive unit connected rigidly to the support structure,
   a wrist portion driven by the first drive unit and supported by the support structure for rotation about a first axis,
   a further wrist portion supported by the driven wrist portion for rotation about a second axis perpendicular to the first axis,
   a second drive unit carried by the driven wrist portion for rotating the further wrist portion about the second axis,
   a third drive unit carried by the further wrist portion, and
   an operative terminal member driven by the third drive unit and rotatable on the further wrist portion about a third axis radial to the second axis;
   wherein the further wrist portion has a crank-like configuration with a proximal end which is rotated about the second axis by the second drive unit by means of a pair of bevel gears, and
   wherein the further wrist portion has a hollow structure and the third drive unit is connected rigidly to the further wrist portion with its axis coinciding with said second axis, the third drive unit being connected to the operative member by a belt transmission and a pair of bevel gears housed in the hollow structure of the further wrist portion.

* * * * *